(12) United States Patent
Steinberg et al.

(10) Patent No.: US 6,748,131 B2
(45) Date of Patent: Jun. 8, 2004

(54) OPTICAL WAVEGUIDE DEVICES AND METHODS OF FABRICATING THE SAME

(75) Inventors: Dan A. Steinberg, Blacksburg, VA (US); David W. Sherrer, Blacksburg, VA (US); Mindaugas F. Dautartas, Radford, VA (US); Donald E. Leber, Radford, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 0 days.

(21) Appl. No.: 09/860,825

(22) Filed: May 21, 2001

(65) Prior Publication Data

US 2002/0028037 A1 Mar. 7, 2002

Related U.S. Application Data

(60) Provisional application No. 60/205,671, filed on May 19, 2000.

(51) Int. Cl.⁷ .............................. G02B 6/26; G02B 6/35; G02B 6/36
(52) U.S. Cl. ............................ 385/20; 385/22; 385/23; 385/50; 385/52
(58) Field of Search ................... 385/20–23, 25, 385/50, 52; 365/16, 23, 50, 52, 33–35

(56) References Cited

U.S. PATENT DOCUMENTS

| | | |
|---|---|---|
| 3,864,018 A | 2/1975 | Miller |
| 4,120,923 A | 10/1978 | Kloker et al. |
| 4,150,870 A | 4/1979 | d'Auria |
| 4,165,496 A | 8/1979 | Di Domenico, Jr. et al. |
| 4,176,908 A | 12/1979 | Wagner |
| 4,210,923 A | 7/1980 | North et al. |
| 4,225,213 A | 9/1980 | McBride, Jr. et al. |
| 4,296,995 A | 10/1981 | Bickel |
| 4,325,604 A | 4/1982 | Witte |
| 4,407,562 A | 10/1983 | Young |
| 4,415,229 A | 11/1983 | McCullough |
| 4,498,730 A | 2/1985 | Tanaka et al. |
| 4,639,074 A | 1/1987 | Murphy |
| 4,699,457 A | 10/1987 | Goodman |
| 4,725,114 A | 2/1988 | Murphy |
| 4,756,590 A | 7/1988 | Forrest et al. |
| 4,859,022 A | 8/1989 | Opdahl et al. |
| 4,900,118 A | 2/1990 | Yanagawa et al. |
| 4,932,745 A | 6/1990 | Blonder |
| 4,973,127 A | 11/1990 | Cannon, Jr. et al. |
| 5,044,711 A | 9/1991 | Saito |
| 5,123,073 A | 6/1992 | Pimpinella |
| 5,127,084 A | 6/1992 | Takahashi |
| 5,135,590 A | 8/1992 | Basavanhally et al. |
| 5,177,804 A | 1/1993 | Shimizu et al. |
| 5,179,609 A | 1/1993 | Blonder et al. |
| 5,181,216 A | 1/1993 | Ackerman et al. |
| 5,185,825 A | 2/1993 | Shigematsu et al. |
| 5,185,846 A | 2/1993 | Basavanhally et al. |
| 5,187,758 A | 2/1993 | Ueda et al. |

(List continued on next page.)

FOREIGN PATENT DOCUMENTS

JP    6385522    4/1988

*Primary Examiner*—David V. Bruce
*Assistant Examiner*—Krystyna Suchecki
(74) *Attorney, Agent, or Firm*—Niels Haun; Jonathan D. Baskin

(57) ABSTRACT

A first waveguide holding member has a first transverse surface region and a first optical waveguide having an end terminating at the first transverse surface region. A second waveguide holding member has a second transverse surface region which confronts the first transverse surface region of the first waveguide holding member and a second optical waveguide having an end terminating at the second transverse surface region. A guide member is operatively coupled to the first and second waveguide holding members and guides the first waveguide holding member in a transverse direction relative to the second waveguide holding member so as to selectively optically couple and decouple the ends of the first and second optical waveguides.

5 Claims, 13 Drawing Sheets

U.S. PATENT DOCUMENTS

| | | |
|---|---|---|
| 5,257,332 A | 10/1993 | Pimpinella |
| 5,297,228 A | 3/1994 | Yanagawa et al. |
| 5,337,384 A | 8/1994 | Basavanhally et al. |
| 5,357,590 A * | 10/1994 | Auracher .................... 385/33 |
| 5,379,361 A | 1/1995 | Maekawa et al. |
| 5,390,266 A | 2/1995 | Heitmann et al. |
| 5,440,655 A | 8/1995 | Kaplow et al. |
| 5,461,683 A | 10/1995 | Harman |
| 5,483,608 A | 1/1996 | Yokomachi et al. |
| 5,499,309 A | 3/1996 | Kozuka et al. |
| 5,500,910 A | 3/1996 | Boudreau et al. |
| 5,500,911 A * | 3/1996 | Roff ............................ 385/33 |
| 5,555,333 A | 9/1996 | Kato |
| 5,566,262 A | 10/1996 | Yamane et al. |
| 5,568,585 A | 10/1996 | Kramer |
| 5,602,951 A | 2/1997 | Shiota et al. |
| 5,611,006 A | 3/1997 | Tabuchi |
| 5,623,564 A | 4/1997 | Presby |
| 5,699,463 A | 12/1997 | Yang et al. |
| 5,732,167 A | 3/1998 | Ishiko et al. |
| 5,778,123 A | 7/1998 | Hagan et al. |
| 5,785,825 A | 7/1998 | Hwang et al. |
| 5,828,800 A | 10/1998 | Henry et al. |
| 5,901,262 A | 5/1999 | Kobayashi et al. |
| 5,909,524 A | 6/1999 | Tabuchi |
| 5,920,665 A | 7/1999 | Presby |
| 6,045,270 A | 4/2000 | Weiss et al. |
| 6,056,696 A | 5/2000 | Kallman |
| 6,064,781 A | 5/2000 | Seibold et al. |
| 6,101,299 A | 8/2000 | Laor |
| 6,118,917 A | 9/2000 | Lee et al. |
| 6,160,936 A | 12/2000 | You et al. |
| 6,234,687 B1 | 5/2001 | Hall et al. |
| 6,320,997 B1 | 11/2001 | Dautartas et al. |
| 6,328,479 B1 | 12/2001 | Schofield et al. |
| 6,393,174 B1 | 5/2002 | Karaguleff et al. |
| 6,393,175 B1 | 5/2002 | Jurbergs et al. |
| 6,477,303 B1 * | 11/2002 | Witherspoon ................ 385/52 |
| 6,519,382 B1 | 2/2003 | Jurbergs et al. |
| 2001/0041026 A1 | 11/2001 | Steinberg et al. |
| 2002/0025104 A1 | 2/2002 | Steinberg et al. |
| 2002/0025107 A1 | 2/2002 | Heiks et al. |
| 2002/0146194 A1 | 10/2002 | Sherrer et al. |
| 2003/0108272 A1 | 6/2003 | Sherrer et al. |

* cited by examiner

OPTICAL WAVEGUIDE DEVICES AND METHODS OF FABRICATING THE SAME

CROSS-REFERENCE TO RELATED APPLICATIONS

Priority is claimed to U.S. Provisional Application Ser. No. 60/205,671, filed May 19, 2000, the entirety of which is incorporated herein by reference.

BACKGROUND OF THE INVENTION

Field of the Invention

The present invention generally relates to optical devices, and more particularly, the present invention relates to optical waveguide switches, variable optical attenuators, and combination waveguide and lenslet arrays.

BACKGROUND OF THE INVENTION

The increasing demand for high-speed voice and data communications has led to an increased reliance on optical communications, particularly optical fiber communications. The use of optical signals as a vehicle to carry channeled information at high speeds is preferred in many instances to carrying channeled information at other electromagnetic wavelengths/frequencies in media such as microwave transmission lines, co-axial cable lines and twisted pair transmission lines. Advantages of optical media are, among others, high-channel (bandwidth), greater immunity to electromagnetic interference, and lower propagation loss. In fact, it is common for high-speed optical communication system to have signal rates in the range of approximately several Giga bits per second (Gbit/sec) to approximately several tens of Gbit/sec.

One way of carrying information in an optical communication system, for example an optical network, is via an array of optical fibers. Ultimately, the optical fibers may be coupled to another array of waveguides, such as another optical fiber array, or a waveguide array of an optoelectronic integrated circuit (OEIC). In order to assure the accuracy of the coupling of the fiber array to another waveguide array, it becomes important to accurately position each optical fiber in the array.

Optical switches serve a variety of applications in optical communication systems. Once type of such optical switches are mechanical switches. Mechanical optical switches have been used in a variety of optical fiber routing applications to switch between particular optical signal pads to provide reliable optical transmission routes for carrying optical signals.

SUMMARY OF THE INVENTION

According to an exemplary embodiment of the present invention, an optical switch includes a first waveguide holding member having a first transverse surface region and a first optical waveguide having an end terminating at the first transverse surface region, and a second waveguide holding member having a second transverse surface region which confronts the first transverse surface region of the first waveguide holding member and a second optical waveguide having an end terminating at the second transverse surface region. A guide member is operatively coupled to the first and second waveguide holding members and guides the first waveguide holding member in a transverse direction relative to the second waveguide holding member so as to selectively optically couple and decouple the ends of the first and second optical waveguides. The guide member includes a plurality of first recesses formed in the first transverse surface region of the first waveguide holding member, a plurality of second recesses formed in the second transverse surface region of the second waveguide holding member and confronting the plurality of first recesses to define a respective plurality of cavities therebetween, and a plurality of guide balls contained with the plurality of cavities, respectively.

According to another exemplary embodiment of the present invention, an optical switch includes a first waveguide holding member having a first transverse surface region and a first optical waveguide, and a second waveguide holding member having a second transverse surface region which confronts the first transverse surface region of the first waveguide holding member and a second optical waveguide. A first lens is optically coupled to an end of the first optical waveguide and located at the first transverse surface region of the first waveguide holding member, and a second lens is optically coupled to an end of the second optical waveguide and located at the second transverse surface region of the second waveguide holding member. A guide member guides the first waveguide holding member in a transverse direction relative to the second waveguide holding member so as to selectively optically couple and decouple the first and second lenses.

According to another exemplary embodiment of the present invention, a variable optical attenuator includes a first waveguide holding member having a first transverse surface region and a first optical waveguide having an end terminating at the first transverse surface region, and a second waveguide holding member having a second transverse surface region which confronts the first transverse surface region of the first waveguide holding member and a plurality of second optical waveguides. The plurality of second optical waveguides have respective ends which terminate at respectively different distances from the second transverse surface region. A guide member guides the first waveguide holding member in a transverse direction relative to the second waveguide holding member so as to selectively optically couple and decouple the end of the first optical waveguide to one of the respective ends of the plurality of second optical waveguides.

According to still another exemplary embodiment of the present invention, a method of fabricating a variable optical attenuator includes placing a first optical waveguide on a first waveguide holding member such that an end of the first optical waveguide terminates at a transverse surface region of the first waveguide holding member. Also, a plurality of pedestals of a tool are placed into a respective plurality of grooves of a second waveguide holding member at a transverse surface region of the second waveguide holding member. The ends of a plurality of second optical waveguides are aligned against respective ends of the plurality of pedestals within the plurality of grooves of the second waveguide holding member. The pedestals of the tool are extracted from the respective plurality of grooves of the second waveguide holding member. Then the first and second waveguide holding members are operatively coupled with a guide mechanism such that the transverse surface of the first waveguide holding member confronts the transverse surface of the second waveguide holding member, and such that the first waveguide holding member is movable in a transverse direction relative to the second waveguide holding member.

According to yet another exemplary embodiment of the present invention, a variable optical attenuator includes a first waveguide holding member having a first transverse surface region and a first optical waveguide, and a second waveguide holding member having a second transverse surface region which confronts the first transverse surface region of the first waveguide holding member and a second optical waveguide. A guide member is operatively coupled to the first and second waveguide holding members and guides the first waveguide holding member in a longitudinal direction relative to the second waveguide holding member. Here, the longitudinal direction is perpendicular to the first and second transverse surface regions of the first and second waveguide holding members. A drive mechanism cooperates with the guide member to move the first waveguide holding member in the longitudinal direction relative to the second waveguide holding member so as to selectively increase and decrease a distance between first and second transverse surface regions of the first and second waveguide holding members.

According to another exemplary embodiment of the present invention, a method of fabricating an optical device includes placing an optical fiber lengthwise in a groove formed in surface of a waveguide holding member. A diameter of the optical fiber relative to a cross-sectional dimension of the groove is such that the optical fiber protrudes above the surface of the waveguide holding member along a length of the groove. A non-stick surface of a lid member is pressed against the optical fiber placed in the groove of the waveguide holding member and an adhesive is applied to the optical fiber and the groove. The adhesive is cured while the non-stick surface of the lid member is pressed against the optical fiber, and the non-stick surface of the lid member is then removed from the optical fiber.

According to yet another aspect of the present invention, an optical device includes a waveguide holding member having a first transverse surface region and an optical waveguide, and a lenslet array holding member having a second transverse surface region which confronts the first transverse surface region of the first waveguide holding member and a lenslet array. An alignment mechanism aligns an end of the optical waveguide relative to the lenslet array and is formed at the first and second transverse surface regions of the waveguide holding member and the lenslet array holding member, respectively.

BRIEF DESCRIPTION OF THE DRAWINGS

The invention is best understood from the following detailed description when read with the accompanying drawings. It is emphasized that the various features are not necessarily drawn to scale. In fact, the dimensions may be arbitrarily increased or decreased for clarity of discussion.

DETAILED DESCRIPTION OF THE PREFERRED EMBODIMENTS

In the following detailed description, for purposes of explanation and not limitation, exemplary embodiments disclosing specific details are set forth in order to provide a thorough understanding of the present invention. However, it will be apparent to one having ordinary skill in the art having the benefit of the present disclosure, that the present invention may be practiced in other embodiments that depart from the specific details disclosed herein. Moreover, descriptions of well-known devices, methods and materials may be omitted so as to not obscure the description of the present invention.

According to exemplary embodiments of the present invention, an optical switch includes a first waveguide holding member and a second waveguide holding member. The first waveguide holding member holds at least one first optical waveguide, and the second waveguide holding member holds at least one second optical waveguide. Advantageously, the first waveguide holding member moves transversely relative to the second waveguide holding member. The transverse motion enables selective coupling between the optical waveguides thereof. Other examples of such devices are described in commonly assigned U.S. patent application Ser. No. 09/835,106, filed Apr. 13, 2001, and entitled "OPTICAL WAVEGUIDE SWITCH", and in commonly assigned U.S. patent application Ser. No. 09/845,773, filed May 2, 2001, and entitled "OPTICAL WAVEGUIDE SWITCH". The contents of these applications are incorporated herein by reference in their entirety.

Figure 1:
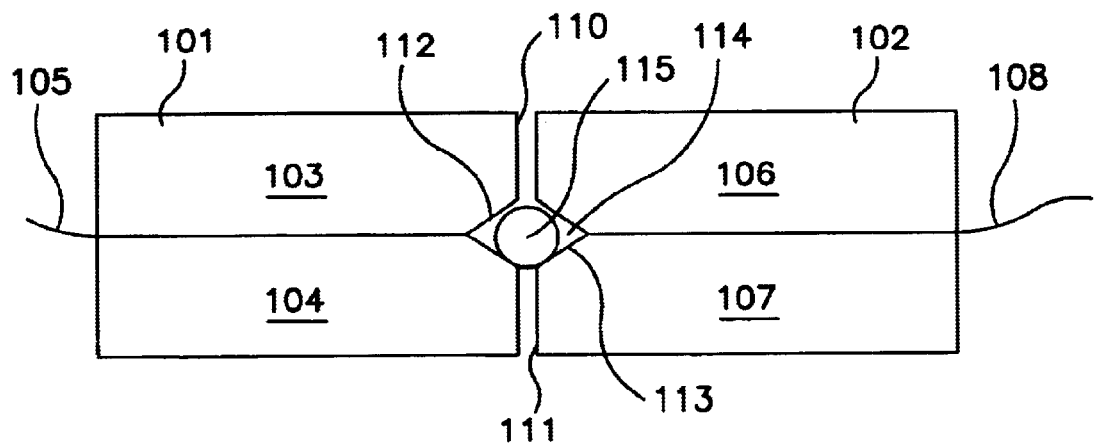
FIG. 1 is a side view of an optical switch according to an illustrative embodiment of the present invention.

FIG. 1 is a side view of an optical switch 100 according to an illustrative embodiment of the present invention. The switch 100 generally includes a first waveguide holding member 101 and a second waveguide holding member 102. Although the first and second waveguide holding members 101 and 102 have identical structures in the present embodiments, these members 101 and 102 may instead be configured so as to have different structures. Reference numerals 110 and 111 denoted confronting and spaced apart transverse regions of the waveguide holding members 101 and 102, respectively.

The first waveguide holding member 101 is made up of a top chip 103 and a bottom chip 104. Optionally, the top chip 103 and the bottom chip 104 are made of silicon or a silicon containing material. Sandwiched between the top chip 103 and the bottom chip 104 are a plurality of optical waveguides 105 (e.g., optical fibers). Optionally, the optical waveguides 105 are contained within cavities defined by opposing grooves formed in the confronting surfaces of the chips 103 and 104. In this particular embodiment, the waveguides 105 terminate at the transverse region 110 of the waveguide holding member 101.

Likewise, the second waveguide holding member 102 is made up of a top chip 106 and a bottom chip 107 which are optionally made of silicon or a silicon containing material. Sandwiched between the top chip 106 and the bottom chip 107 are a plurality of optical waveguides 108 (e.g., optical fibers). Optionally, the optical waveguides 108 are contained within cavities defined by opposing grooves formed in the confronting surfaces of the chips 106 and 107. In this particular embodiment, the waveguides 106 terminate at the transverse region 111 of the waveguide holding member 102.

A guide mechanism is additionally provided to move the waveguide holding member 101 in a transverse direction relative to the waveguide holding member 102. Here, the transverse direction is perpendicular to the plane of the diagram of FIG. 1. In this illustrative embodiment, the guide mechanism is formed by the combination of recess-defined cavities and guide balls (or ball bearings). In particular, referring to FIG. 1, opposing recesses 112 and 113 are defined in the transverse regions 110 and 111 of the first and second waveguide holding members 101 and 102, respectively. The opposing recesses 112 and 113 define a cavity 114 for containing a guide ball 115 (e.g., a ball lense). As shown, the recesses 112 and 113 may optionally have a V-shaped cross-section. The diameter of each guide ball 115 is sufficient so as to minimize frictional contact between the opposing transverse surfaces 110 and 111 of the first and second waveguide holding members 101 and 102, respectively. The guide balls 115 may be formed of ceramics, metals or other hard materials. For example, the guide balls 115 may be formed of quartz, silicon nitride or zirconium. The cavity 114 extends lengthwise in the transverse direction such the guide ball 115 functions to guide the waveguide holding member 101 in a transverse direction relative to the waveguide holding member 102.

The waveguide holding members 101 and 102, and particularly the recesses 112 and 113, may optionally be coated with a wear-resistant material (e.g., CVD silicon nitride).

Figure 2:
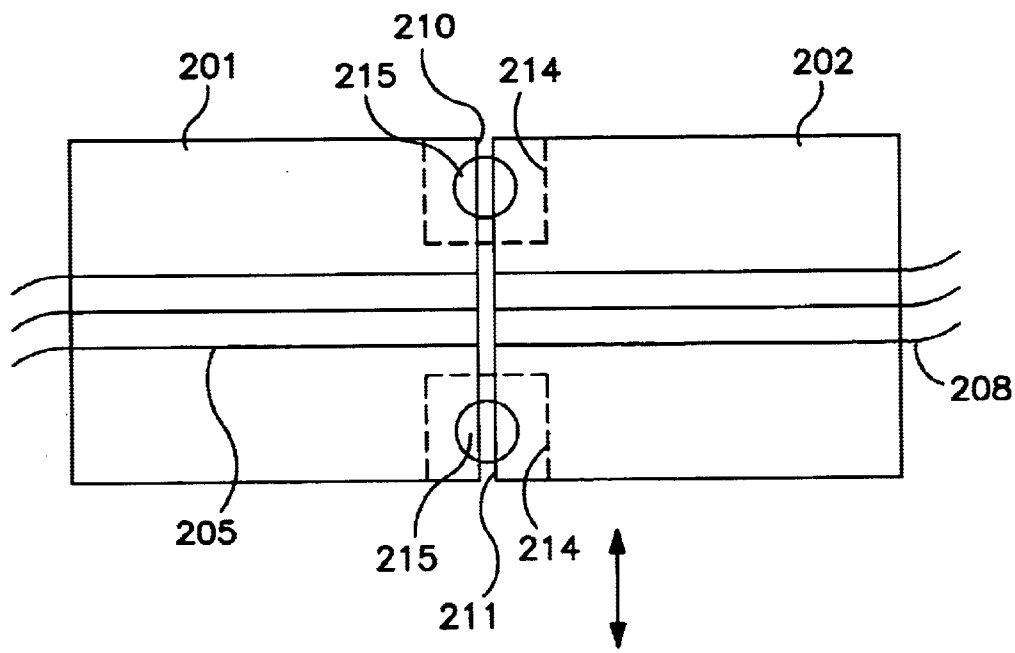
FIG. 2 is a top view of the optical switch shown in FIG. 1.

Reference is now made to FIG. 2 which shows a top view of the optical switch shown in FIG. 1. As illustrated by the double-headed arrow, the transverse direction is parallel to the plane of the diagram of FIG. 2.

In FIG. 2, reference numerals 201 and 202 denote the first and second waveguide holding members, respectively. As shown, a plurality of optical waveguides 205 extend within the first waveguide holding member 201 and terminate at the transverse region 210. Likewise, another plurality of optical waveguides 208 extend within the second waveguide holding member 202 and terminate at the transverse region 211. Also, the guide balls 215 are contained within cavities 214 and interposed between the transverse regions 210 and 211.

As should be readily apparent, the rolling action of the guide balls 215 within the cavities 114 allows for transverse movement of the first waveguide holding member 101 relative to the second waveguide holding member 102. In this manner, the ends of the optical fibers 205 may be selectively aligned with (and therefore optically coupled with) the ends of the optical fibers 208. An optical switch is thereby realized.

Motion of the first waveguide holding member 101 relative to the second waveguide holding member 102 may be through use of any number of known actuators, including, but not limited to, electromagnetic, piezoelectric, microelectro-mechanical (MEM), and hydraulic devices. Also, either one of the first and second waveguide holding members 101 and 102 may be secured in a fixed position, while movement of the other is actuated.

Other configurations for achieving transverse movement of the first waveguide holding member relative to the second waveguide holding member may be adopted, such as those described in the previously mentioned commonly assigned U.S. patent application. Further, the guide balls for guiding the first waveguide holding member relative to the second waveguide holding member may be replaced with other suitable components. For example, transverse cylinders may be provided which function as guide rails. In this case, the waveguide holding members slide along the guide cylinders, as opposed to rolling on the guide balls. The cylinders can be formed, for example, of precision-drawn glass fibers.

Figure 3:
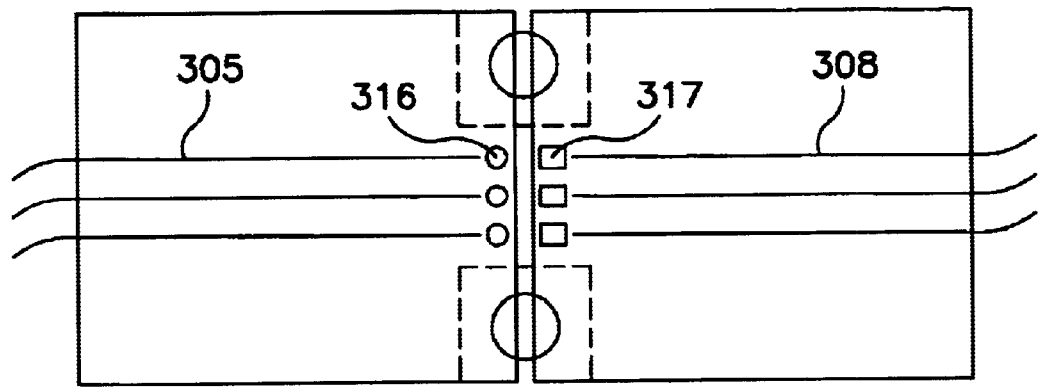
FIG. 3 illustrates a modification of the embodiment of FIGS. 1 and 2 in which the ends of optical waveguides are terminated with ball lenses and/or GRIN lenses.

FIG. 3 illustrates a modification of the embodiment of FIGS. 1 and 2 in which the ends of the optical waveguides 305 and 308 are terminated with ball lenses 316 and/or GRIN lenses 317. These lenses 316 and 317 help reduce the mechanical alignment tolerances needed for optical coupling, and can be disposed in grooves or square etched pits, as is known in the art of micro-optical bench devices.

Figure 4:
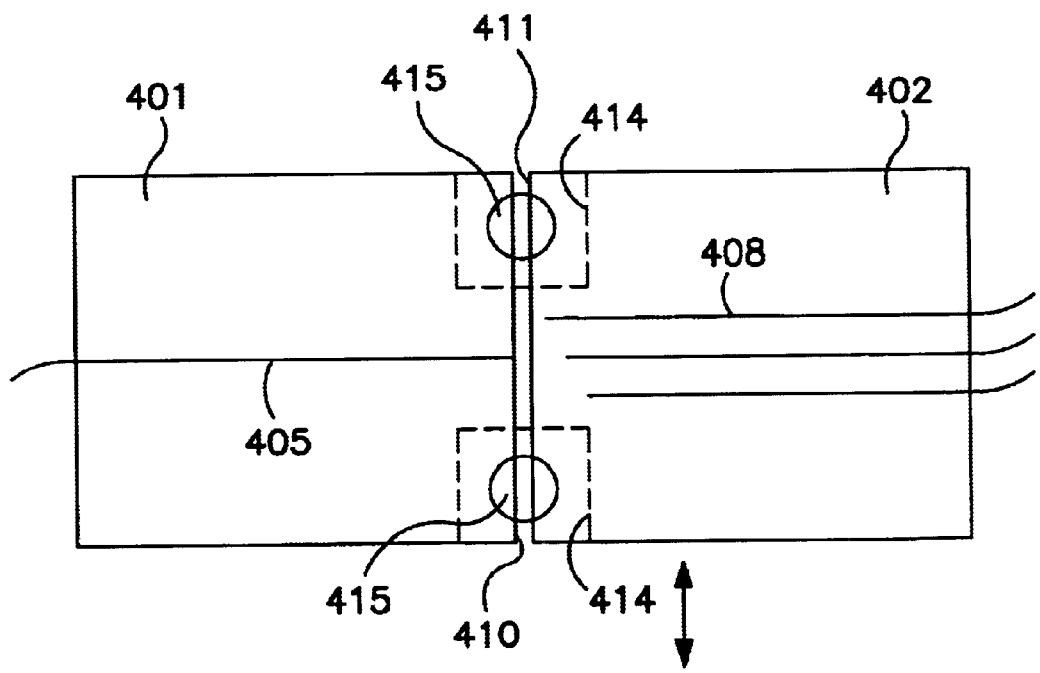
FIGS. 4–7 illustrate a variable attenuator according to another embodiment of the present invention.

FIGS. 4–7 illustrate another embodiment of the present invention in which a variable attenuator is realized. Referring first to FIG. 4, the device includes a first waveguide holding member 401 and a second waveguide holding member 402, which move in a transverse direction (double-headed arrow) by action of the cavities 414 and guide balls 415 in the same manner as described above in connection with FIGS. 1 and 2.

In this illustrative embodiment, the first waveguide holding member 401 contains a an optical waveguide 405 having an end that terminates at the transverse region 410. On the other hand, the second waveguide holding member 402 contains a plurality of optical waveguides 408 having ends which terminate at respectively different distances from the transverse region 411. In other words, the endfaces of the optical waveguides 408 have different longitudinal positions as shown in FIG. 4.

Figure 5:
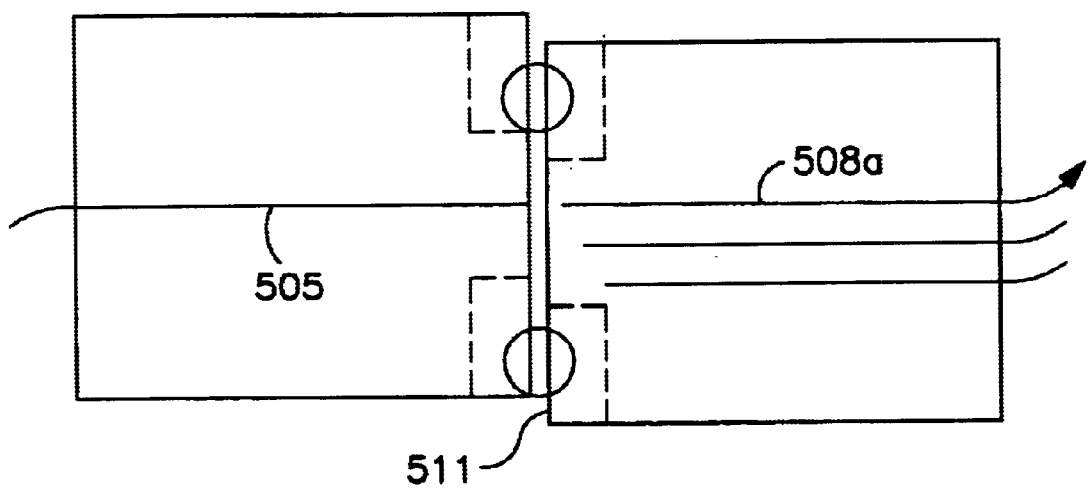
Figure 6:
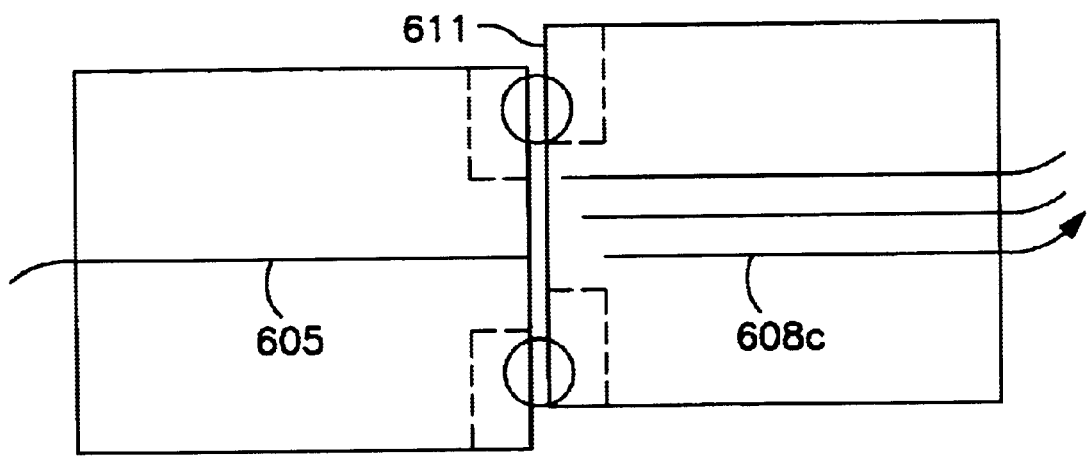

As should be readily apparent, a variable optical attenuator is realized by the transverse movement of the first waveguide holding member 401 relative to the second waveguide holding member 402. FIG. 5 illustrates a "low attenuation" switch position in which the optical waveguide 505 is aligned with the optical waveguide 508a having an end closest to the transverse region 511. In contrast, FIG. 6 illustrates a "high attenuation" switch position in which the optical waveguide 605 is aligned with the optical waveguide 608c having an end closest to the transverse region 611. Since the aligned endfaces of FIG. 6 are spaced further apart than in FIG. 5, increased attenuation is achieved.

Figure 7:
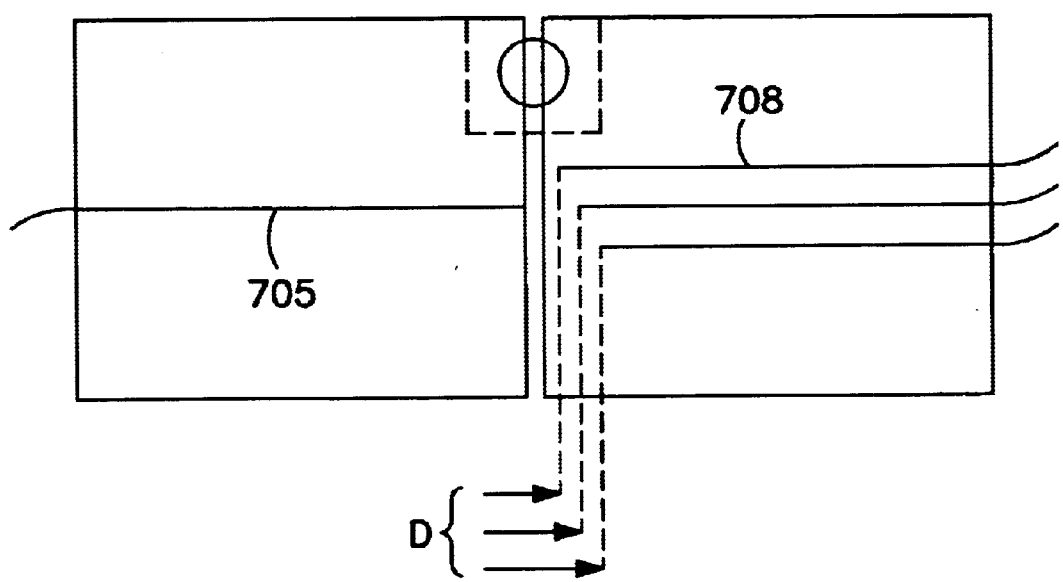

Referring to FIG. 7, the relative spacing steps D between the endfaces of the optical waveguide 705 and each of the optical waveguides 708 depend on the attenuation values desired. For large steps in attenuation, relatively large spacing steps would be needed. Conversely, small steps in attenuation would require relatively small spacing steps. Optionally, the longitudinal spacing between the waveguide endfaces can be on the order of 0.5, 1, 2, 4, 5, 8, 10 or so microns. Also, the spacing between adjacent optical waveguides need not be constant. Rather, since attenuation is a nonlinear function of endface separation, a non-constant spacing between adjacent optical waveguides may be needed to obtain constant steps in attenuation. Further, although not shown, the ends of the waveguides of FIGS. 4–7 may also include the ball lenses and/or GRIN lenses as illustrated in FIG. 3.

Figure 8:
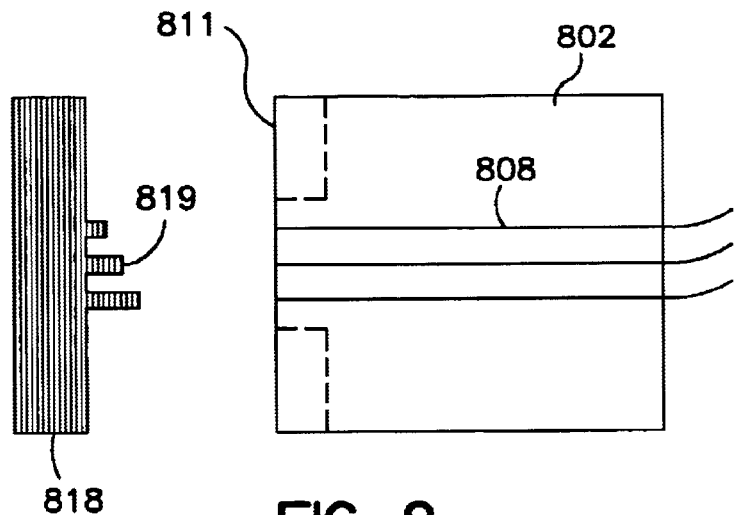
FIGS. 8–10 illustrate use of a micro-machined tool as a fiber stop in the fabrication of the variable attenuator of FIGS. 4–7.
Figure 9:
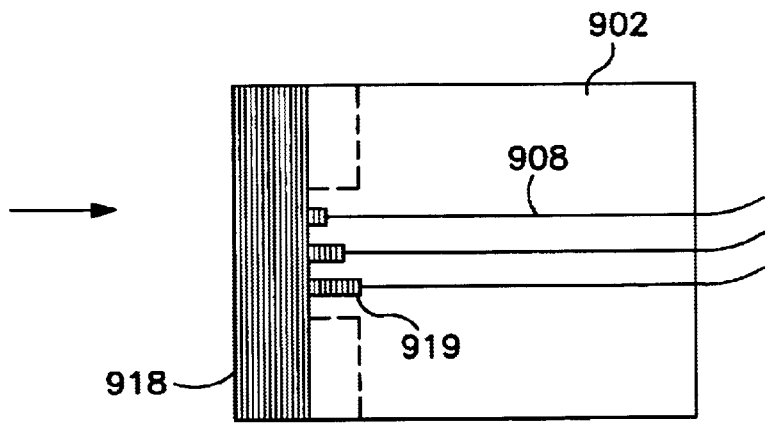
Figure 10:
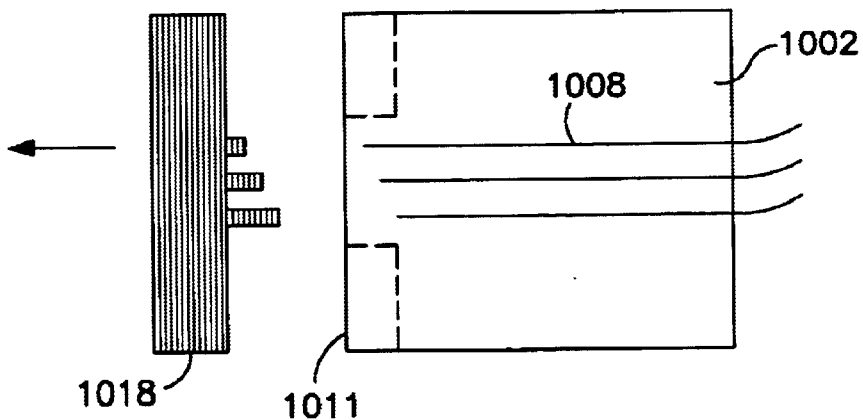

Precision placement of the ends of the optical waveguides 708 of FIG. 7 may be achieved by use of a micro-machined tool as a fiber stop as illustrated in FIGS. 8–10. Referring first to FIG. 8, a plurality of optical waveguides (e.g., fibers) are placed within the cavities or grooves of a waveguide holding member 802. Also, a micro-machined tool 818 having pedestals 819 is provided. The height of the pedestals determines the longitudinal spacing of the optical waveguides from the transverse region 811 of the waveguide holding member 802.

Then, as shown in FIG. 9, the pedestals 919 of the tool 918 are inserted into the respective cavities or grooves of the waveguide holding member 902 so as to displace the ends of the optical waveguides 908. Alternately, the tool 918 can be position prior to insertion of the optical waveguides 908, in which case the ends of the optical waveguides 908 are abutted against the already positioned pedestals 919. Upon extraction of the tool 1018 as shown in FIG. 10, the ends of the optical waveguides 1008 are precisely spaced at different distances from the transverse region 1011 of the waveguide holding member 1002.

Figure 11:
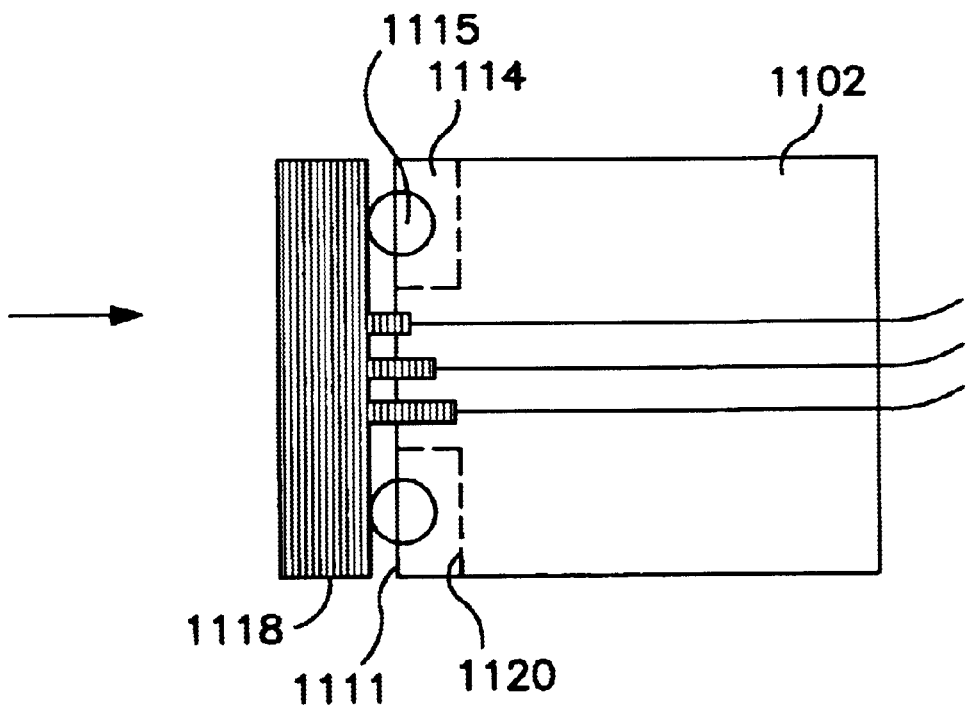
FIGS. 11 and 12 illustrate modifications of the use of the micro-machined tool of FIGS. 8–10.

FIG. 11 illustrates a variation in which the guide balls 1115 are in first placed in the recesses 1114 such that the micro-machined tool 1118 is pressed against the guide balls 1115. This assures that the waveguide endfaces are aligned with respect to the front face 1120 of the recesses 1114, which may provide greater accuracy as compared to the saw-cut or polished transverse surface 1111 of the waveguide holding member 1102.

Figure 12:
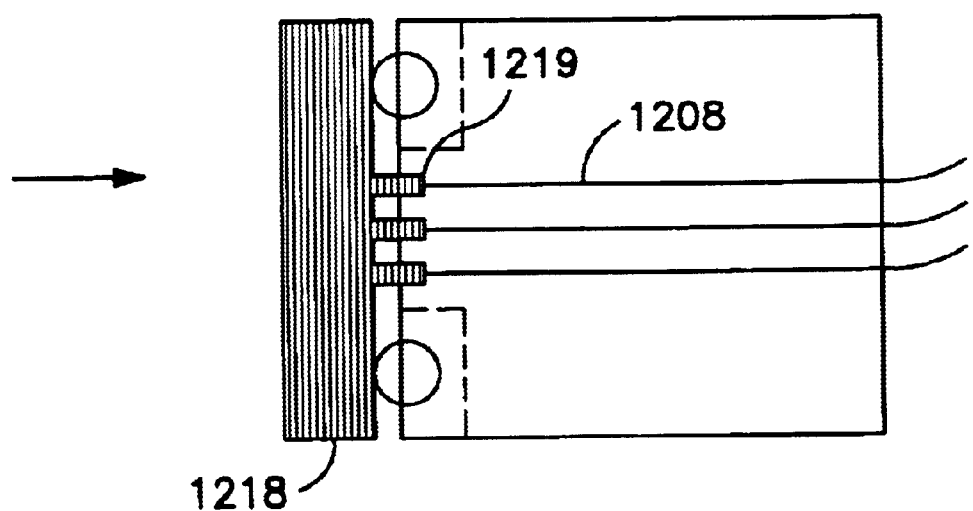

FIG. 12 illustrates another variation in which the micro-machined tool has pedestals of equal height that are used to locate the endfaces of the waveguides 1208 at the same, countersunk longitudinal positions.

The pedestals of the micro-machined tool described above are preferably small enough to fit inside the grooves or cavities of the waveguide holding member which contain the optical waveguides. Also, the pedestals and/or the waveguides may be coated with a protective coating (e.g., a polymer coating) to prevent scratching of the waveguide endfaces by the pedestals. The micro-machined tool can be made of silicon or similar materials, such as silicon dioxide, and can be fabricated by a DRIE process.

Figure 13:
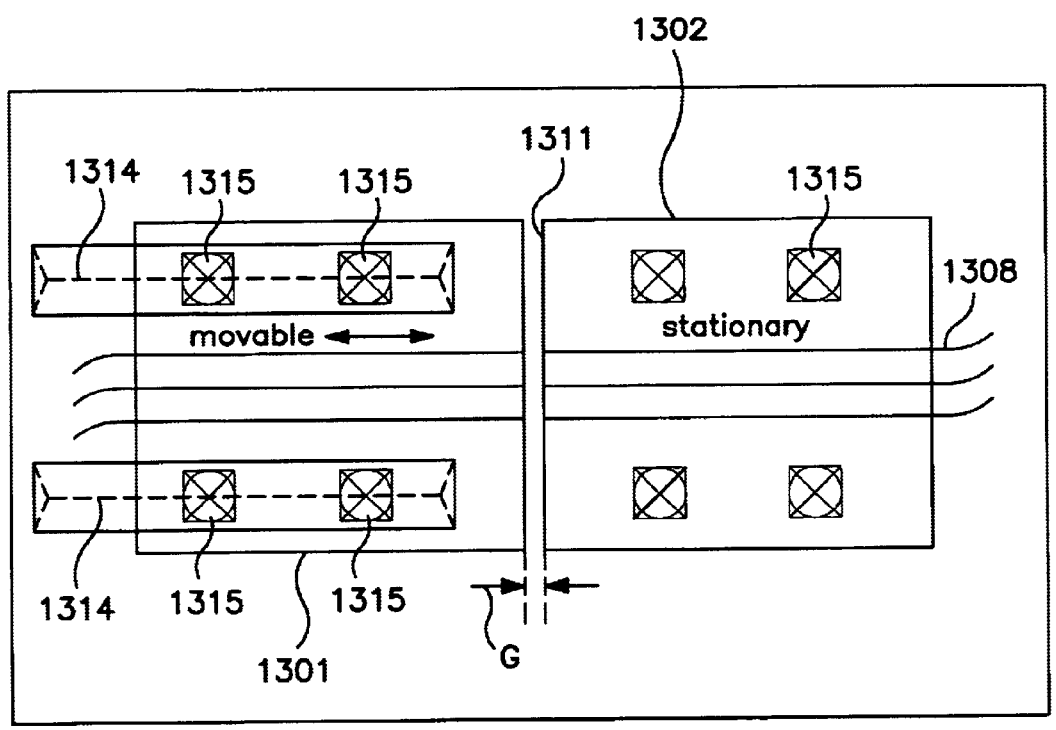
FIGS. 13–14 illustrate a variable attenuator according to yet another embodiment of the present invention.

FIG. 13 illustrates another embodiment of an variable optical attenuator according to the present invention. This configuration is similar to that described in the aforementioned application Ser. No. 09/835,906, with the primary exceptions being that one of the waveguide holding members is optionally fixed in place (non-movable) and a drive mechanism is provided to move the other of the waveguide holding members in a longitudinal direction.

In particular, referring to FIG. 13, first and second waveguide holding members 1301 and 1302 are placed on the surface of a base substrate 1300. Movement of the second waveguide holding member 1302 is constrained by the provisions of ball lenses 1315 in cavities defined by opposing etched pits in the confronting surfaces of the member 1302 and the substrate 1300. This second waveguide holding member 1302 contains a plurality of optical waveguides 1308 with terminate at the transverse regions denoted by reference number 1311.

In contrast, the first waveguide holding member 1301 is moveable in the longitudinal direction (doubled-headed arrow) by the provision of guide balls 1315 in the elongate cavities defined by opposing elongate recesses 1314 formed in the confronting surfaces of the member 1301 and the substrate 1300. That is, the waveguide holding member 1302 is movable by the rolling action of the guide balls 1315, which in turn allows for variable spacing of the gap G between opposing transverse regions of the first and second waveguide holding members 1301 and 1302. In this manner, a variable optical attenuator is realized.

Figure 14:
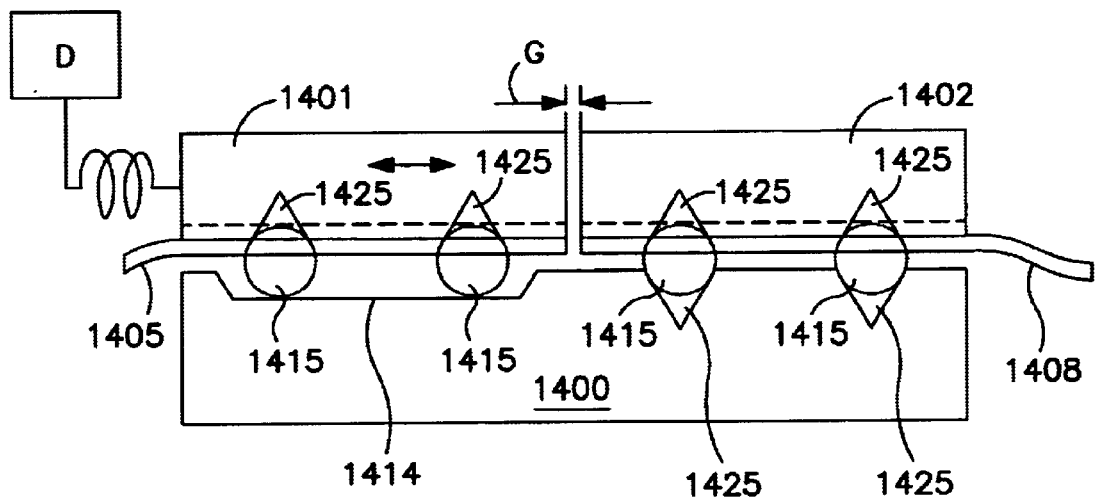

FIG. 14 is a side-view of the variable optical attenuator shown in FIG. 13. As shown, the lower surface of each of the first and second waveguide holding members 1401 and 1402 includes a plurality of "pits" 1425 for partially containing the guide balls 1415. Likewise, the surface of the substrate 1400 contain pits 1425 opposite to the pits 1425 of the lower surface of the second waveguide holding member 1402. The pits 1425 are sized so as to prevent a rolling action of the guide balls 1415, and accordingly, movement of the second waveguide holding member 1402 is constrained.

On the other hand, the surface of the substrate 1400 which is opposite the pits 1425 of the first waveguide holding member 1401 includes an elongate recess 1414 as shown in FIG. 14. The rolling action of the guide balls 1415 within the elongate recesses 1414 translates into longitudinal movement of the first waveguide holding member 1401 relative to the second waveguide holding member 1402. The gap spacing G is thereby varied, which in turn results in variable optical attenuation.

Motion of the movable first waveguide holding member 1401 can be achieved by any suitable drive mechanism D, including piezoelectric actuators. Further, the gap spacing G can be vary, for example, in a range between 0 and 40 microns, thus providing a wide range of attenuation values. Also, ball lenses and/or GRIN lenses can be provided at the ends of the optical waveguides to collimate the light in the gap G. However, collimation lenses may tend to increase the gap spacing needed for a given attenuation value.

Figure 15:
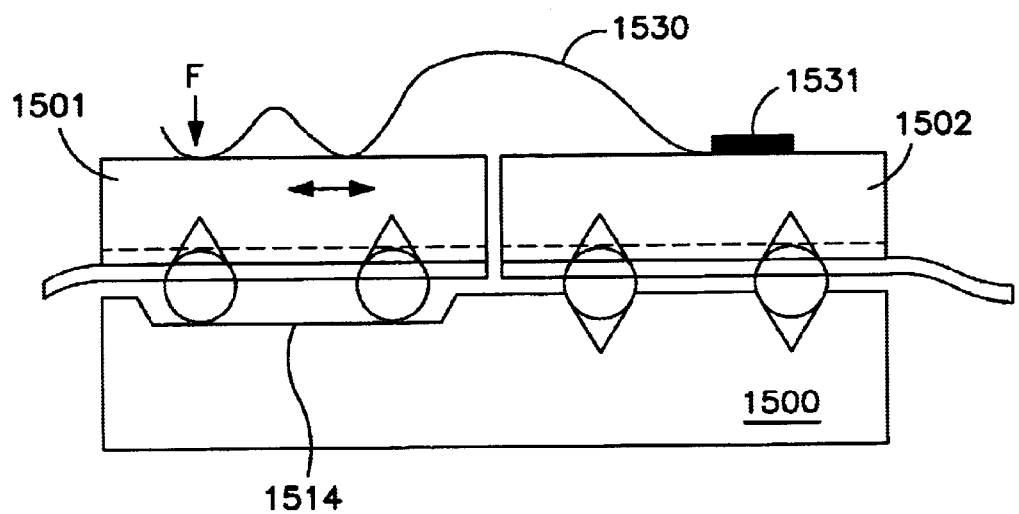
FIG. 15 illustrates an alternative embodiment of the variable attenuator of FIGS. 13–14.

As shown in FIG. 15, in an alternative embodiment a metal spring 1530 is used to apply a downward force F as shown on the movable first waveguide holding member 1501. This helps maintain the member 1501 within the recesses 1514. A spring attachment 1531 may be fixed (e.g., by glue) to either the base substrate 1500 or the stationary second waveguide holding member 1502.

Figure 17:
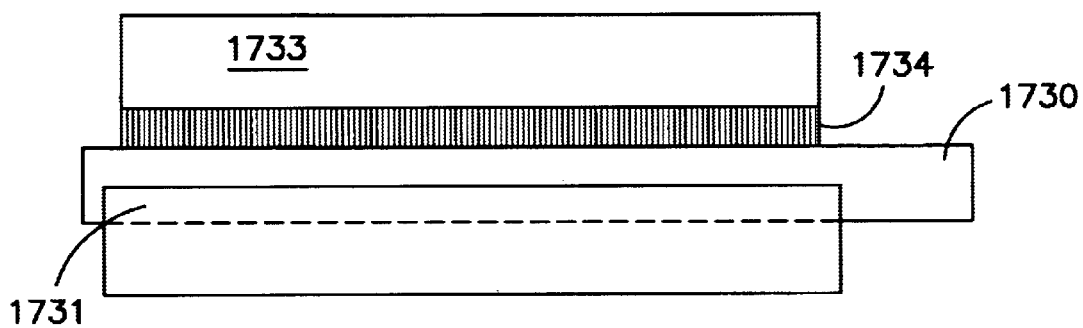
Figure 18:
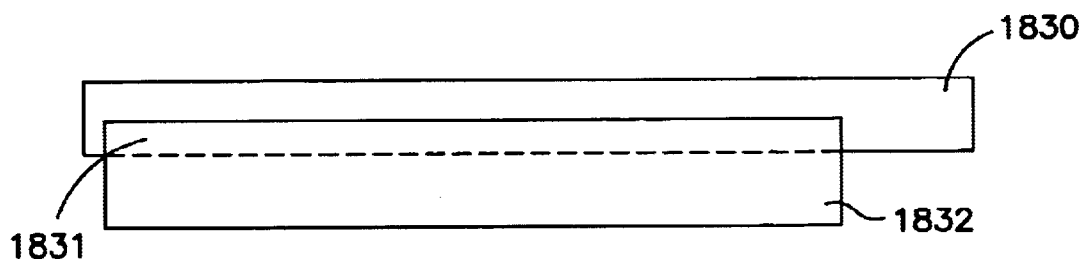

Another embodiment of the present invention will now be described with reference to FIGS. 16–18. As described previously, for example, in connection with FIG. 1, the optical waveguides may be sandwiched between opposing surfaces of two chips to thereby define a waveguide holding member. However, the waveguide holding member can be formed of a single grooved chip in which the waveguides thereof remain exposed and are not covered by the grooves of an opposing chip.

Figure 16:
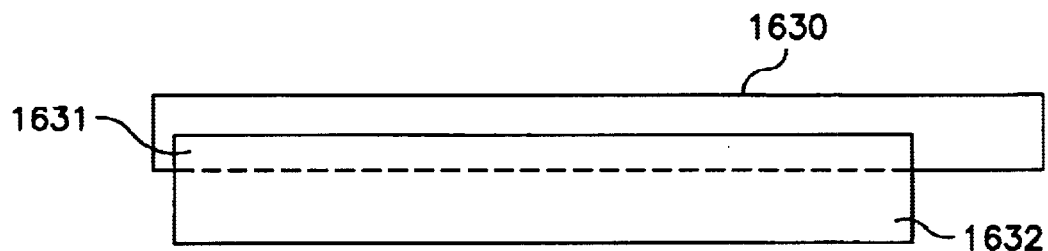
FIGS. 16–18 illustrate a process of providing an open faced waveguide holding member according to another embodiment of the present invention.

In particular, referring to FIG. 16, an optical fiber 1630 is placed in the groove 1631 of a chip 1632 as shown. A diameter of the optical fiber 1630 relative to a cross-dimension of the groove 1631 is such that the optical fiber 1630 protrudes above the surface of the waveguide holding member 1632 along a length of the groove 1631. Optionally, the groove has a V-shaped cross-section. Next, as shown in FIG. 17, the fiber 1730 is pressed into the groove 1731 using a lid 1733 and glued in place. The lid 1733 may optionally be made of silicon or silica, and preferably includes a non-stick coating 1734 to avoid sticking of the glue. The coating 1734 is preferably elastomeric, and may be teflon or polymide. The glue is cured and the lid removed to obtain the configuration of FIG. 18 in which the optical fiber 1830 is fixed within the groove 1831 and exposed to define an open face waveguide holding member 1832. Such an open faced member can be used, for example, in the fabrication of a variable optical attenuator of FIGS. 13–15.

Still further embodiments of the present invention will now be described with reference to FIGS. 19–27. Each of these embodiments is at least partially characterized by the provision of a lenslet array in place of one of the waveguide holding members.

Figure 19:
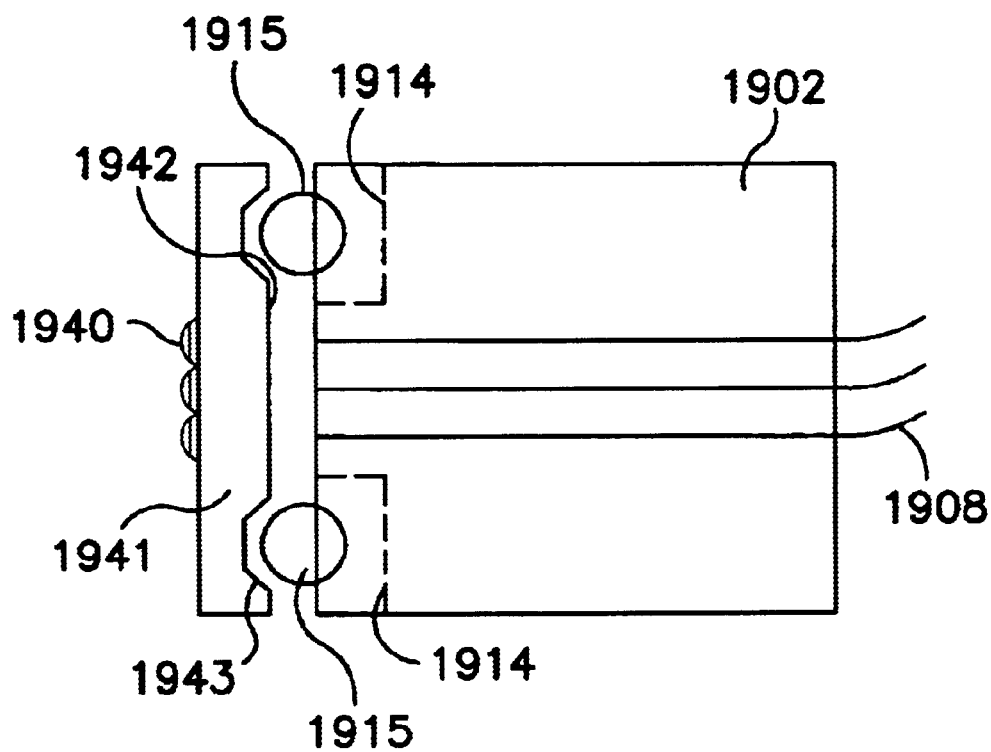
FIGS. 19–27 illustrate further embodiments of present invention in which a lenslet array is provided in place of one of the waveguide holding members.

Referring first to FIG. 19, reference number 1902 denotes a waveguide holding member which is similar in structure to the second waveguide holding member 102 described above in connection with FIGS. 1 and 2. As such, the waveguide holding member 1902 includes a plurality of optical waveguides 1908 that extend within the waveguide holding member 1902 and terminate at the transverse region 1911. Also, recesses are formed within the transverse region 1911 for the purpose of containing guide balls 1915.

The optical waveguides 1908 of the waveguide holding member 1902 are optically combined with a lenslet array 1940 of a lenslet array holding member 1941. The transverse surface 1942 of the lenslet array holding member 1941 includes a plurality of pits 1943 which are aligned with and partially contain the guide balls 1915. In this manner, the lenslet array holding member 1941 is movable in the transverse direction (doubled-headed arrow) relative to the waveguide holding member 1902.

In the configuration of FIG. 19, the lenslet array 1940 faces away from the waveguide holding member 1902. However, as shown in FIG. 20, the lenslet array 2040 may instead face towards the waveguide holding member 2002.

Figure 20:
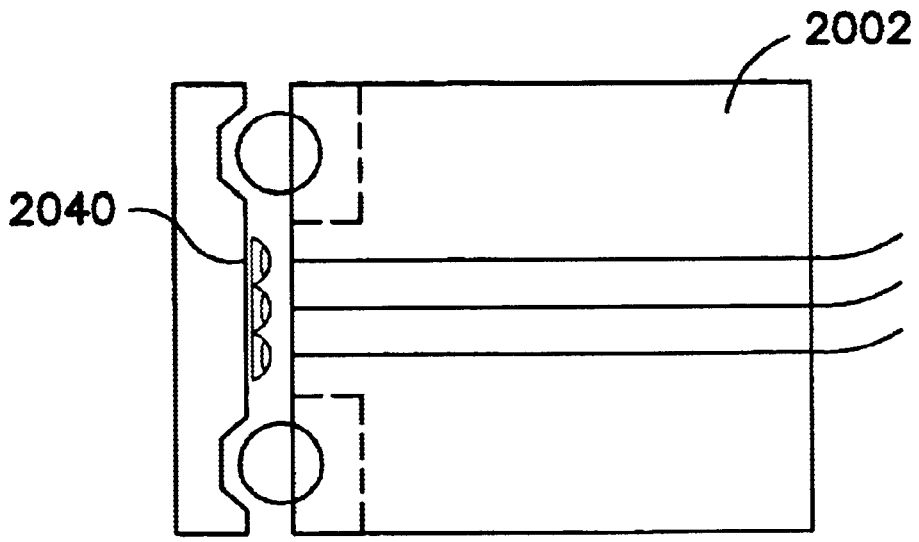
Figure 21:
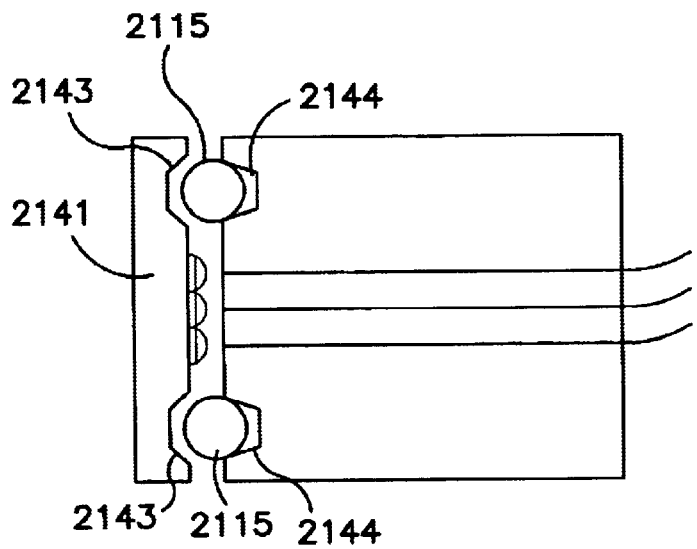

Also, in the configuration of FIGS. 19 and 20, the transverse region of the waveguide holding member contains elongate recesses which allow for transverse movement of the lenslet array holding member as a result of a rolling action of the guide balls. However, in cases where relative transverse movement is not needed or desired, the elongate recess can be replace with smaller dimension pits 2144 as shown in FIG. 21. Here, the pits 2144 are aligned with the corresponding pits 2143 of the lenslet array holding member 2141, with the ball lenses 2115 placed therebetween as shown.

Figure 22:
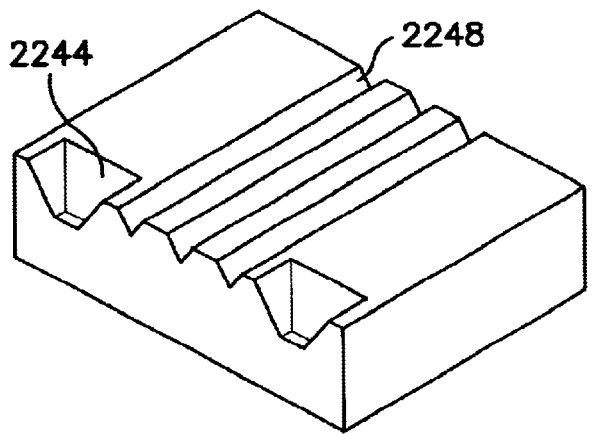
Figure 23:
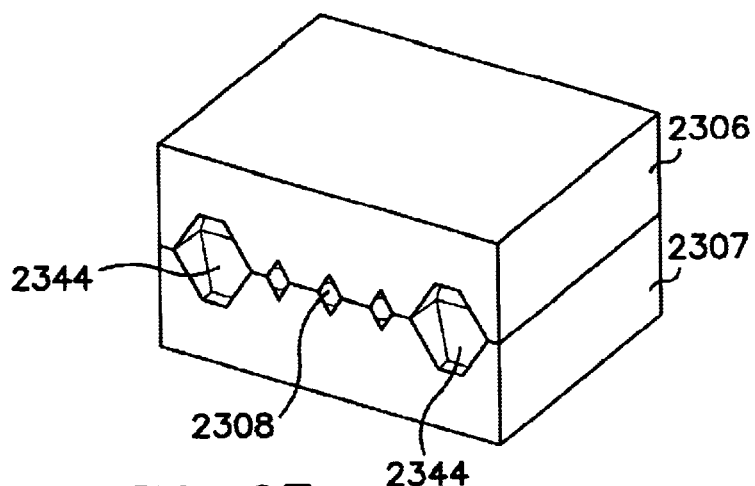

FIG. 22 is a perspective view of a lower chip of the waveguide holding member of FIG. 21. As shown, one-half of a pit 2244 is wet-etched in a transverse region 2211 of the lower chip 2207 having grooves 2248 on a surface thereof. Then, a shown in FIG. 23, as similarly configured upper chip 2306 is placed on the lower chip 2307 to define the pits 2344 and the cavities for containing the optical fibers 2308.

Figure 24:
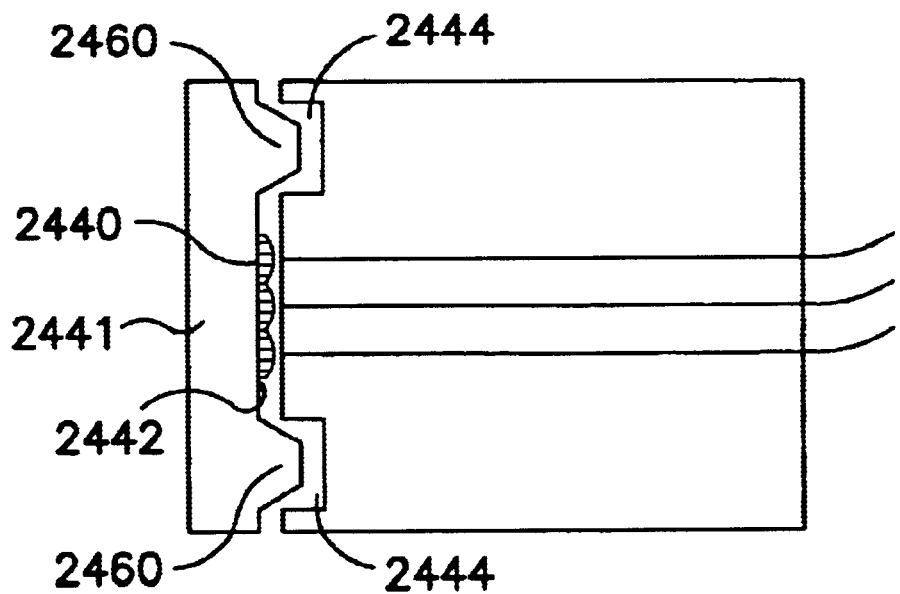

In the cases were transverse movement of the lenslet array holding member is to be avoided, the ball lenses (or guide balls) of the previous embodiments need not be provided. For example, as shown in FIG. 24, the transverse region 2442 of the lenslet array holding member 2441 may instead be formed with protrusions 2460 for alignment with the corresponding pits 2444 of the waveguide holding member 2402. In this case, the lenslet array 2440 can be disposed in a wet-etched recess defined between the protrusions 2460. Optionally, the lenslet array holding member 2441 can be made of silicon, and the protrusions 2460 are defined by the <111> silicon plane. Also optionally, the lenslet array holding member 2441 can be made from an SOI (silicon-on-insulator) wafer, in which case the protrusions are determined by the device layer thickness and the lenslets are disposed on the insulating layer of the SOI wafer.

Figure 25:
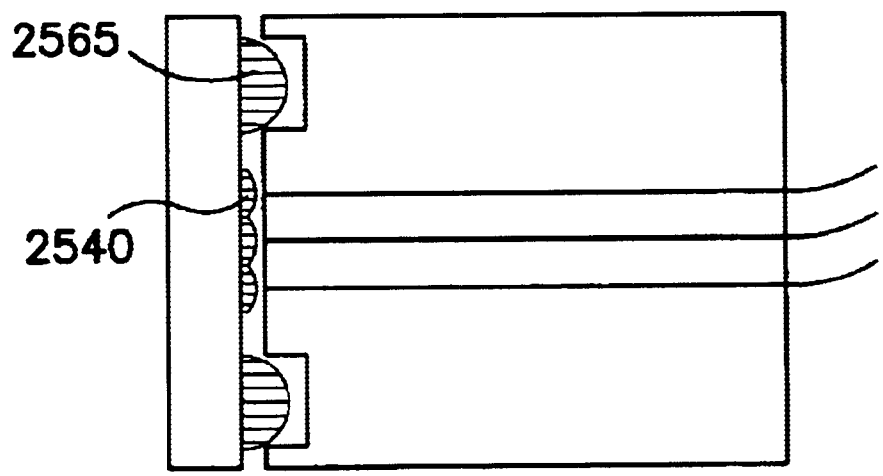

FIG. 25 illustrates an alternative embodiment in which the alignment protrusions of FIG. 24 are replaced with relative large "lenslets" 2565. In this case, the alignment lenslets 2565 can advantageously be formed during the same process used to fabricate the lenslet array 2540.

Figure 26:
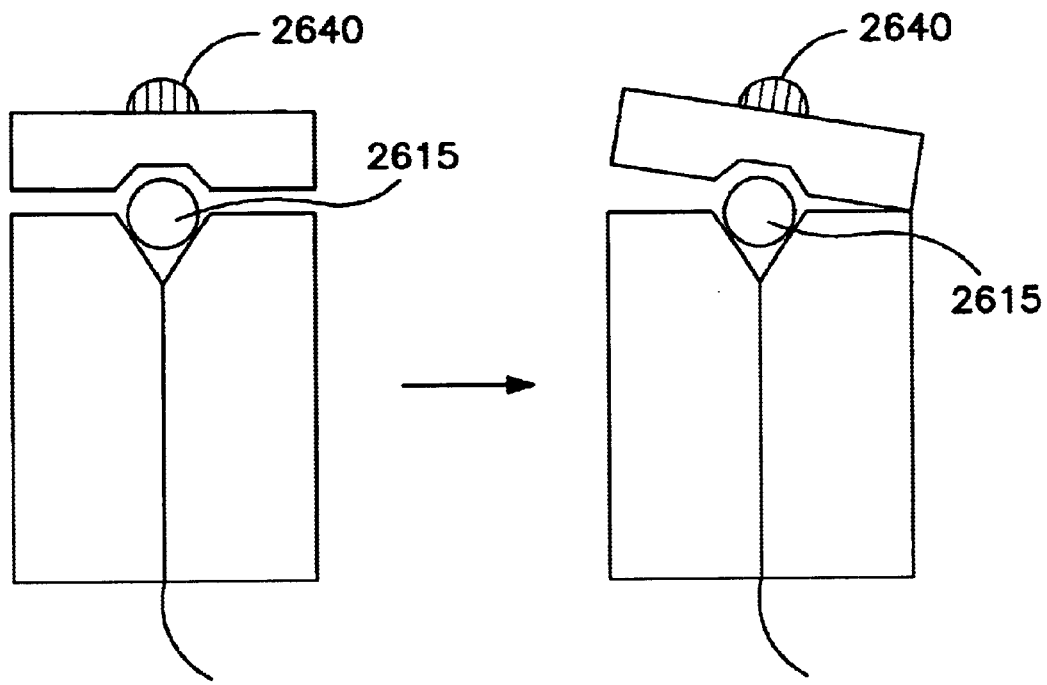
Figure 27:
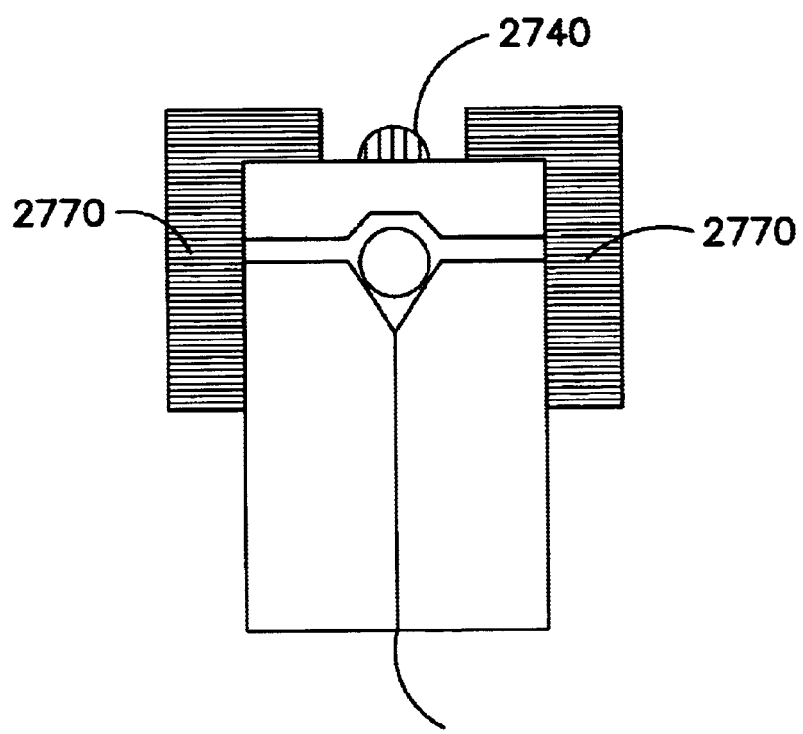

FIGS. 26 illustrates yet another alternative embodiment in which the lenslet array 2640 can be pivoted about the lens ball 2615. In the case where pivoting is not desired, the jigs 2770 of FIG. 27 can be used to hold the lenslet array 2740 while it is glued in placed.

While the invention has been described in detail with respect to a number of exemplary embodiments, it is clear that various modifications of the invention will become apparent to those having ordinary skill in art having had benefit of the present disclosure. Such modifications and variations are included in the scope of the appended claims.

What is claimed is:

1. An optical switch comprising:
    a first waveguide holding member comprising a first transverse surface region and a first optical waveguide having an end terminating at the first transverse surface region;
    a second waveguide holding member comprising a second transverse surface region which confronts the first transverse surface region of the first waveguide holding member and a second optical waveguide having an end terminating at the second transverse surface region; and
    a guide member which is operatively coupled to the first and second waveguide holding members and which guides the first waveguide holding member in a transverse direction relative to the second waveguide holding member so as to selectively optically couple and decouple the ends of the first and second optical waveguides,
    wherein the guide member comprises (a) a plurality of first recesses formed in the first transverse surface region of the first waveguide holding member, (b) a plurality of second recesses formed in the second transverse surface region of the second waveguide holding member and confronting the plurality of first recesses to define a respective plurality of cavities therebetween, and (c) a plurality of guide balls contained with the plurality of cavities, respectively.

2. An optical switch comprising:
    a first waveguide holding member comprising a first transverse surface region and a first optical waveguide;
    a first lens optically coupled to an end of the first optical waveguide and located at the first transverse surface region of the first waveguide holding member;
    a second waveguide holding member comprising a second transverse surface region which confronts the first transverse surface region of the first waveguide holding member and a second optical waveguide;
    a second lens optically coupled to an end of the second optical waveguide and located at the second transverse surface region of the second waveguide holding member; and
    a guide member which is operatively coupled to the first and second waveguide holding members and which guides the first waveguide holding member to move relative to the second waveguide holding member in a direction transverse to the optical axis of the second optical waveguide so as to selectively optically couple and decouple the first and second lenses.

3. The optical switch as claimed in claim 2, wherein at least one of the first and second lenses is a ball lens.

4. The optical switch as claimed in claim 2, wherein at least one of the first and second lenses is a GRIN lens.

5. A method for fabricating an optical switch, comprising the steps of:
    providing a first waveguide holding member including a first transverse surface region and a first optical waveguide having an end terminating at the first transverse surface region;
    providing a second waveguide holding member including a second transverse surface region and a second optical waveguide having an end terminating at the second transverse surface region;

placing the second waveguide holding member proximate the first waveguide holding member so that the second transverse surface region confronts the first transverse surface region of the first waveguide holding member; and providing a guide member which is operatively coupled to the first and second waveguide holding members and which guides the first waveguide holding member in a transverse direction relative to the second waveguide holding member so as to selectively optically couple and decouple the ends of the first and second optical waveguides, the guide member comprising (a) a plurality of first recesses formed in the first transverse surface region of the first waveguide holding member, (b) a plurality of second recesses formed in the second transverse surface region of the second waveguide holding member and confronting the plurality of first recesses to define a respective plurality of cavities therebetween, and (c) a plurality of guide balls contained with the plurality of cavities, respectively.

* * * * *